(12) United States Patent
McKenzie et al.

(10) Patent No.: US 8,622,839 B1
(45) Date of Patent: Jan. 7, 2014

(54) ENHANCING USER EXPERIENCE BY PRESENTING PAST APPLICATION USAGE

(75) Inventors: Bruce J. McKenzie, Murrieta, CA (US); Adam J. Overton, Redmond, WA (US); Brian D. Fisher, Irvine, CA (US); Isaac J. Shepard, Ladera Ranch, CA (US); Eden Ashley JnBaptiste, Orlando, FL (US); Eric M. Zhang, Fremont, CA (US); Jason C. Jenks, Lynnwood, WA (US); Patrick G. McCuller, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 193 days.

(21) Appl. No.: 12/964,225

(22) Filed: Dec. 9, 2010

(51) Int. Cl.
*A63F 13/00* (2006.01)

(52) U.S. Cl.
USPC ............ 463/42; 463/7; 463/8; 463/9; 463/40; 463/41

(58) Field of Classification Search
USPC ........................................................ 463/7–9
See application file for complete search history.

(56) References Cited

U.S. PATENT DOCUMENTS

| | | | |
|---|---|---|---|
| 2005/0054444 A1* | 3/2005 | Okada | 463/42 |
| 2006/0287106 A1* | 12/2006 | Jensen | 463/42 |
| 2007/0004507 A1* | 1/2007 | Nakajima et al. | 463/29 |
| 2007/0088862 A1* | 4/2007 | Burkman et al. | 710/16 |
| 2007/0093293 A1* | 4/2007 | Osnato | 463/36 |
| 2007/0124791 A1* | 5/2007 | Spechtler et al. | 725/133 |
| 2008/0274798 A1* | 11/2008 | Walker et al. | 463/25 |
| 2008/0280686 A1* | 11/2008 | Dhupelia et al. | 463/42 |
| 2009/0270166 A1* | 10/2009 | Thukral et al. | 463/25 |
| 2010/0016073 A1* | 1/2010 | Goldstein et al. | 463/29 |
| 2010/0304860 A1* | 12/2010 | Gault et al. | 463/31 |

OTHER PUBLICATIONS

Planet Unreal, "Unreal Tournament Game Guide", game released Nov. 1999 with earliest article comment on Sep. 6, 2007,IGN Entertainment, <http://planetunreal.gamespy.com/View.php?view=UTGameInfo.Detail&id=28&game=6><http://planetunreal.gamespy.com/View.php?view=UTGameInfo.Detail&id=1&game=6>.*

Unreal Tournament 1999, http://www.fingel.com/ut/, retrieved Jan. 25, 2013, 4 pages.

* cited by examiner

*Primary Examiner* — Ronald Laneau
*Assistant Examiner* — Justin Myhr
(74) *Attorney, Agent, or Firm* — Thomas | Horstemeyer, LLP

(57) ABSTRACT

Disclosed are various embodiments for enhancing the experience of a user with an application by presenting past usage of the application. An application is executed in a hosted environment in one or more computing devices. Multiple input commands are obtained from a client, and the input commands are provided to the application. A video signal generated by the application is encoded into real-time content, which is sent to the client. Recorded content from a library of recorded content is sent to the client. Each recorded content presents a past usage of the application.

31 Claims, 5 Drawing Sheets

ENHANCING USER EXPERIENCE BY PRESENTING PAST APPLICATION USAGE

BACKGROUND

Video games and other computer-based games are often designed to be challenging. As an example, the execution of a complex move may be needed by a player to make it past a certain checkpoint in a game. Such a move may involve a rapid succession of input commands. The player may benefit from continued practice in order to execute the move. However, even with continued practice, the player may not be able to continue past the checkpoint.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to enhancing the experience of a user with an application by presenting past usage of the application. The application may comprise, for example, a game application or some other type of application. In the case of a challenging video game, a user may get frustrated by not being able to complete an objective or to move on to the next level of the game. Although the user may talk with other players, consult references, or repeatedly practice gaming techniques, it may be most helpful to the user to see another player complete the objective or advance to the next level.

Various embodiments of the present disclosure are configured to present multimedia showing past usage of an application in conjunction with the current usage of the application. Such multimedia may include, for example, videos of past usage, voiceovers by experienced users, textual annotations, and so on. The video and/or other media streams generated by an application executed in a hosted environment may be captured and stored for future reference by other users. Such stored application sessions may be indexed, annotated, and made available to users when appropriate. In the following discussion, a general description of the system and its components is provided, followed by a discussion of the operation of the same.

Figure 1:
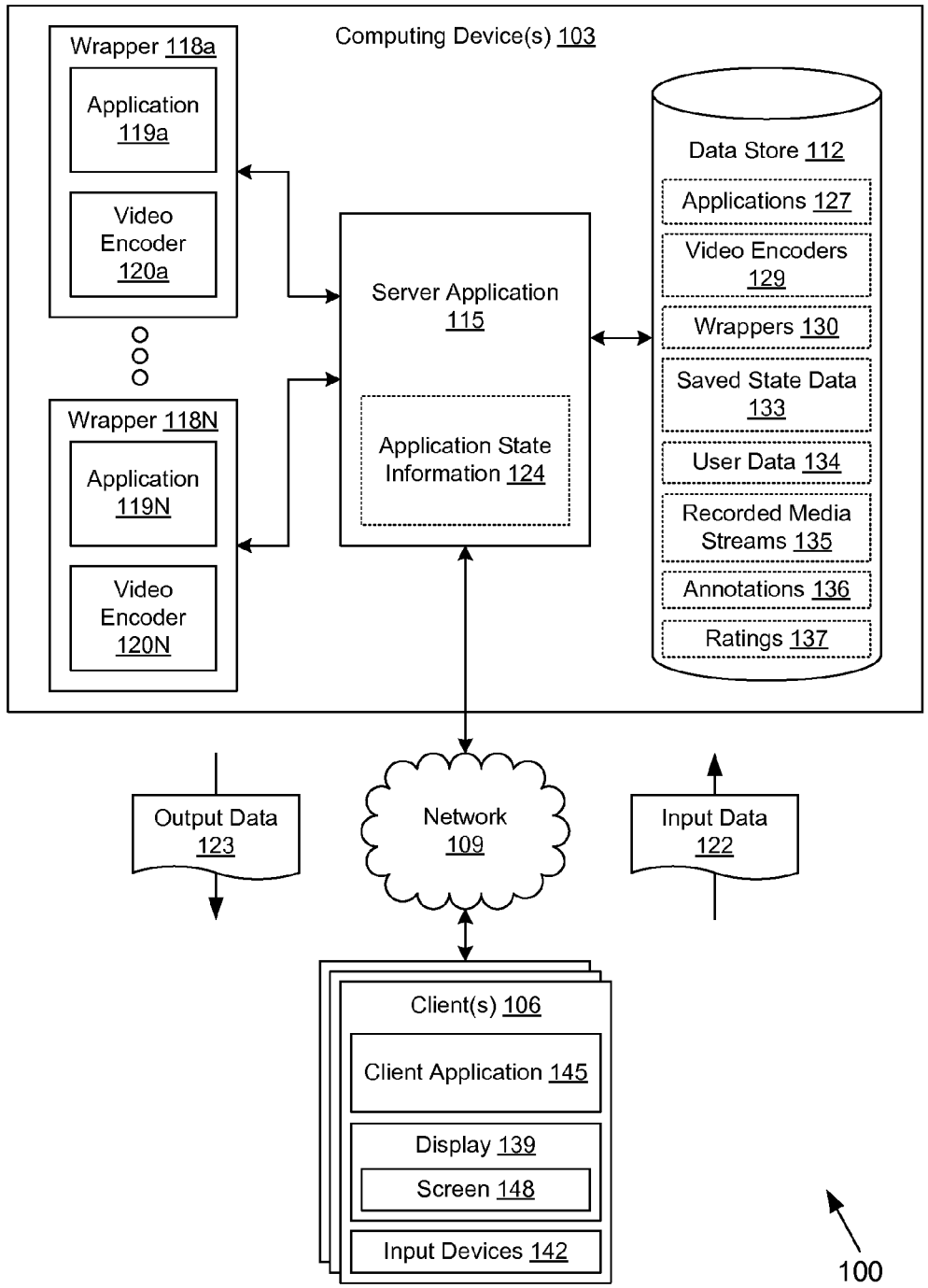
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a server application 115, a plurality of wrappers 118a . . . 118N, a plurality of applications 119a . . . 119N, a plurality of video encoders 120a . . . 120N, and other applications, services, processes, systems, engines, or functionality not discussed in detail herein. The server application 115 may correspond to a game server application or another type of application session server. The server application 115 is executed to launch applications 119, which are executed within the wrappers 118. The server application 115 is also executed to obtain input data 122 from the clients 106 and provide the input data 122 to the respective wrapper 118.

The server application 115 is also executed to send output data 123 that is captured from the application 119 to the clients 106. The server application 115 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The server application 115 is configured to maintain application state information 124 associated with the executing applications 119.

The application 119 may correspond, for example, to a game or other types of applications. As non-limiting examples, the application 119 may correspond to a first-person shooter game, an action game, an adventure game, a party game, a role-playing game, a simulation game, a strategy game, a vehicle simulation game, and/or other types of games. The application 119 may be a game originally designed for execution in a general-purpose computing device or in a specialized video game device such as, for example, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. Where game applications are mentioned in the following text, it is understood that game applications are merely examples of the many different types of applications 119.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The wrapper 118 corresponds to an application that provides a hosted, controlled, and/or virtualized environment for execution of the application 119. In particular, the wrapper 118 may be configured to virtualize one or more of the resources that the application 119 expects to access. Such resources may include a keyboard, a mouse, a joystick, a video device, a sound device, etc. In this way, the wrapper 118 is able to provide input commands to the application 119 as if the wrapper 118 emulates a keyboard, a mouse, or another type of input device.

Further, the wrapper 118 is able to obtain a video signal generated by the application 119 as if the wrapper 118 emulates a display device, an audio device, or another type of output device. The wrapper 118 is able to encode the video signal by way of a video encoder 120 into a media stream. The media stream may include an audio signal generated by the application 119 as well. To this end, the wrapper 118 may include various types of video encoders 120, such as, for example, Moving Pictures Experts Group (MPEG) encoders, H.264 encoders, Flash® video encoders, etc. Such video encoders 120 may be selected according to factors such as, for example, data reduction, encoding quality, latency, etc. In some embodiments, the wrappers 118 may communicate directly with the clients 106 to obtain the input data 122 and to serve up the output data 123.

Different types of wrappers 118 may be provided for different applications 119 or classes of applications 119. As non-limiting examples, different wrappers 118 may be provided for applications 119 using different application programming interfaces (APIs) such as OpenGL®, DirectX®, the Graphics Device Interface (GDI), and so on. Where the application 119 is configured for execution in a specialized video game device or another type of computing device, the wrapper 118 may include an emulation application that emulates the device or the software of the device.

The application state information 124 that is maintained by the server application 115 includes various data relating to application sessions that are currently active. For example, the application state information 124 may track the users that are currently participating in the application session, status information associated with the users, security permissions associated with the application session (e.g., who can or cannot join), and so on. In some embodiments, some or all of the application state information 124 may be discarded when an application session ends.

The data stored in the data store 112 includes, for example, applications 127, video encoders 129, wrappers 130, saved state data 133, user data 134, recorded media streams 135, annotations 136, ratings 137, and potentially other data. The applications 127 correspond to a library of different applications that are available to be launched as applications 119. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 119 for multiple application sessions.

The video encoders 129 correspond to the various types of video encoders 120 that may be employed in the computing device 103. Some video encoders 129 may correspond to specific formats, such as, for example, H.264, MPEG-4, MPEG-2, and/or other formats. The wrappers 130 correspond to the executable code that implements the various types of wrappers 118. The wrappers 130 are executable in the computing device 103 and may be executed as multiple instances of the wrappers 118 for multiple game sessions.

The saved state data 133 corresponds to game states that have been saved by the applications 119. Because the applications 119 are executed in a virtualized environment, the applications 119 may write state information to a virtual location, which is then mapped for storage in the data store 112 as the saved state data 133. The saved state data 133 may correspond to data saved normally by the application 119 or may correspond to a memory image of the application 119 that may be resumed at any time. The user data 134 includes various data related to the users of the applications 119, such as, for example, input command history for applications 119, security credentials, application 119 preferences, billing information, a listing of other users that are permitted to join application sessions started by the user, and so on.

The recorded media streams 135 correspond to a library of past media streams that have been recorded and stored in the data store 112. In one embodiment, the recorded media streams 135 correspond to the data associated with portions of the media streams that are sent to clients 106. In other embodiments, the recorded media streams 135 may be encoded using additional data reduction techniques, such as, for example, reducing the resolution of a video stream, encoding the parts of the media stream using a more aggressive data compression approach, and so on. In some embodiments, fingerprints that characterize the recorded media streams 135 may be stored along with the recorded media streams 135 for easy location and retrieval of relevant recorded media streams 135.

The annotations 136 correspond to annotations for the recorded media streams 135. In one embodiment, the annotations 136 may include voiceovers by users to explain what is occurring in the recorded media streams 135. In another embodiment, the annotations 136 may include textual descriptions to explain what is occurring in the recorded media streams 135. In some embodiments, the annotations 136 may be provided in association with a media stream for a currently executing application 119 to provide helpful hints, tips, explanations, etc. to assist users in proceeding with the application 119. Although annotations 136 may be provided by the user whose application 119 usage generated the recorded media stream 135, annotations 136 may also be provided by other users as well.

The ratings 137 include ratings and/or other feedback data regarding the recorded media streams 135 by users. There may be numerous recorded media streams 135 that depict a certain usage of an application 119. Some of these recorded media streams 135 may depict better usage than others. For instance, where the application 119 is a game, one recorded media stream 135 may show poor game play of a level, while another recorded media stream 135 may show superior game play of the level. Although both recorded media streams 135 may depict completion of the same level, the one showing superior game play is likely to be preferred by users. To help distinguish among numerous recorded media streams 135, ratings 137 from users may be collected that indicate user opinions regarding particular recorded media streams 135. Accordingly, the recorded media streams 135 may be filtered according to the highest rating, ratings above a certain threshold, etc.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices 142 may incorporate haptic technologies in order to provide feedback to the user.

The client 106 may be configured to execute various applications such as a client application 145 and/or other applications. The client application 145 is executed to allow a user to launch, join, play, or otherwise interact with an application 119 executed in the computing device 103. To this end, the client application 145 is configured to capture input commands provided by the user through one or more of the input devices 142 and send this input over the network 109 to the computing device 103 as input data 122.

The client application 145 is also configured to obtain output data 123 over the network 109 from the computing device 103 and render a screen 148 on the display 139. To this end, the client application 145 may include one or more video and audio players to play out a media stream generated by an application 119. In one embodiment, the client application 145 comprises a plug-in within a browser application. The client 106 may be configured to execute applications beyond the client application 145 such as, for example, browser applications, email applications, instant message applications, and/or other applications.

Next, a general description of the operation of the various components of the networked environment 100 is provided. To begin, a user at a client 106 sends a request to launch an application 119 to the server application 115. The server application 115 obtains the corresponding application 127, video encoder 129, and wrapper 130 from the data store 112. The server application 115 then launches the application 119 in the corresponding wrapper 118. The server application 115 tracks the status of the application 119 within the application state information 124.

The wrapper 118 provides a virtualized environment for the application 119 that virtualizes one or more resources of the computing device 103. Such resources may include exclusive resources, i.e., resources for which the application 119 requests exclusive access. For example, the application 119 may request full screen access from a video device, which is an exclusive resource because normally only one application can have full screen access. Furthermore, the wrapper may virtualize input devices such as, for example, keyboards, mice, etc. which may not actually be present in the computing device 103. In various embodiments, the wrapper 118 may correspond to a virtual machine and/or the wrapper 118 may be executed within a virtual machine.

The user at the client 106 enters input commands for the application 119 by use of the input devices 142 of the client 106. As a non-limiting example, the user may depress a left mouse button. Accordingly, the client application 145 functions to encode the input command into a format that may be transmitted over the network 109 within the input data 122. The server application 115 receives the input command and ultimately passes it to the wrapper 118. The wrapper 118 then provides a left mouse button depression to the application 119 by way of a virtualized mouse.

In some embodiments, different input commands may be presented to the application 119 from those that were generated by a client 106. As a non-limiting example, if a user sends a mouse down command and the client application 145 loses focus, the wrapper 118 may be configured to send a mouse down command followed by a mouse up command. In various embodiments, the input commands may be relayed to the wrapper 118 as soon as possible, or the input commands may be queued by the wrapper 118 in an input queue and relayed to the application 119 sequentially from the queue according to another approach.

Meanwhile, the graphical output of the application 119 is captured by the wrapper 118 and encoded into a media stream. Additionally, the audio output of the application 119 may be captured and multiplexed into the media stream. The media stream is transmitted by the server application 115 to the client 106 over the network 109 as the output data 123. The client application 145 obtains the output data 123 and renders a screen 148 on the display 139.

Subsequently, other users may join the application 119 and participate like the first user. A user may start an application 119 at one client 106 and continue the application 119 at another client 106. Furthermore, multiple users at diverse locations may participate in an application 119. As a non-limiting example, an application 119 may have been developed to be executed in one device with multiple game controllers. Accordingly, the wrapper 118 may be configured to map input commands from one client 106 to a first virtual game controller and input commands from another client 106 to a second virtual game controller. As another non-limiting example, an application 119 may have been developed to be executed in one device, where one side of the keyboard controls the first player and the other side of the keyboard controls the second player. Accordingly, the wrapper 118 may be configured to map input commands from one client 106 to keys on one side of a virtual keyboard and input commands from another client 106 to keys on another side of the virtual keyboard.

Various embodiments enable input generated through one type of input device 142 in a client 106 to be transformed by the wrapper 118 into input commands provided to the application 119 through an entirely different type of virtual input device. As a non-limiting example, input generated by an accelerometer in the client 106 may be translated by the wrapper 118 into input provided through a virtual mouse. Thus, completely different kinds of input devices 142 may be used in the application 119 that may not have been contemplated when the application 119 was implemented.

Where the input devices 142 incorporate haptic technologies and devices, force feedback may be provided to the input devices 142 within the output data 123. As a non-limiting example, a simulated automobile steering wheel may be programmed by force feedback to give the user a feel of the road. As a user makes a turn or accelerates, the steering wheel may resist the turn or slip out of control. As another non-limiting example, the temperature of the input device 142 may be configured to change according to force feedback. In one embodiment, force feedback generated from the input data 122 of one client 106 may be included in the output data 123 sent to another client 106.

Because the client 106 is decoupled from the hardware requirements of the application 119, the application 119 may be used remotely through a diverse variety of clients 106 that are capable of streaming video with acceptable bandwidth and latency over a network 109. For example, a game application 119 may be played on a client 106 that is a smartphone. Thus, the client 106 need not include expensive graphics hardware to perform the complex three-dimensional rendering that may be necessary to execute the application 119. By contrast, the hardware of the computing device 103 may be upgraded, as needed, to meet the hardware requirements of the latest and most computationally intensive applications 119. In various embodiments, the video signal in the media stream sent by the server application 115 may be scaled according to the bitrate and/or other characteristics of the connection between the computing device 103 and the client 106 over the network 109.

When a user is interacting with the application 119, the user may become frustrated with completing specific tasks or meeting certain objectives of the application 119. To this end, the user may enter an input command for help. In various embodiments, such a command may pause the execution of the application 119 and/or launch another user interface alongside the user interface of the application 119 as rendered in the client 106. Alternatively, the user may enter a command that "bookmarks" the current application status for future reference in a help interface.

In some cases, the user might not explicitly enter a command for help, but the server application 115 may automatically identify that the user is having difficulty. In one embodiment, the server application 115 examines the input command history for the user to determine if the user is stuck in the application 119. As a non-limiting example, a user experiencing difficulty in a game may be repeatedly executing the same input commands to attempt to kill a "boss" in the game but be unsuccessful. As another non-limiting example, the user may be spending an excessive amount of time performing a task of the application 119.

Help may be provided to the user based on the experiences of other users when they have previously used the application 119. Such help may be provided in the form of annotations 136 and/or walkthroughs in the application 119. In various embodiments, a user interface may be provided for the user to select recorded content from a library that shows another user using the application 119 at or near the same point in the application 119. The recorded content may include an input command history to show the user how to perform the moves, tasks, etc. depicted in the recorded content. In one embodiment, the user may be able to automatically provide input commands to the application 119 based on such an input command history in order to perform the moves, tasks, etc. As a non-limiting example, the recorded input commands may take control over the current game of a player in order to help the player get past a difficult checkpoint.

In some cases, the recorded content may be identified from the recorded media streams 135 based on the graphical output of the application 119 by a fingerprinting technique that, for example, examines colors, contrast, etc. associated with the current video signal of the application 119 and compares them with the colors, contrast, etc. of portions of the recorded media streams 135 as represented in fingerprints stored with the recorded media streams 135. In other words, with a positive fingerprint match, the backgrounds may be similar, the combinations of colors may be similar, and/or other quantifiable aspects of the recorded media streams 135 may be similar to the current video signal of the application 119.

Fingerprinting comparisons may also be done based on the audio signal generated by the application 119 and encoded audio signals in the recorded media streams 135. For instance, a particular audio or music cue might uniquely identify a state in the application 119 that can be cross referenced with the recorded media streams 135. Fingerprinting comparisons may also be performed based upon the order of input commands currently provided to the application 119 and the input command histories associated with the recorded media streams 135.

In addition to automated fingerprint identification of recorded media streams 135, manual tagging may be employed. To illustrate, a user may be able to tag a current position in the media stream being generated by the application 119. Such a tag may be used in indexing the portion of the media stream within the recorded media streams 135. Other users may subsequently perform a search on the tags that describe the recorded media streams 135 in order to find recorded media streams 135 that are relevant.

As a non-limiting example, the application 119 may correspond to a game such as Teenage Mutant Ninja Turtles® (TMNT) which was originally released by Konami Corporation as a coin-operated arcade game. For example, suppose that a user is playing the TMNT game at a client 106, has selected the "Donatello" character, and is currently battling "Bebop," the boss of stage 2. The user may be getting repeatedly beaten up by "Bebop" and/or may be entering the same commands over and over. The server application 115 may then identify the user as having difficulty and then offer suggestions for help. Alternatively, the user may enter a hotkey to request help.

In conjunction with the current game output, which may or may not be paused, a recorded video of another user as "Donatello" battling "Bebop" may be shown. The recorded video may be selected based on user-specified criteria, popularity, and/or appropriateness to the current position of the user in the TMNT game. The command sequences of the other user may also be shown. Accordingly, the user may watch the game play in the recorded video and learn the strategy for beating "Bebop." In addition, a voiceover by the other user and/or textual help may be provided to describe what is going on in the recorded video.

Figure 2:
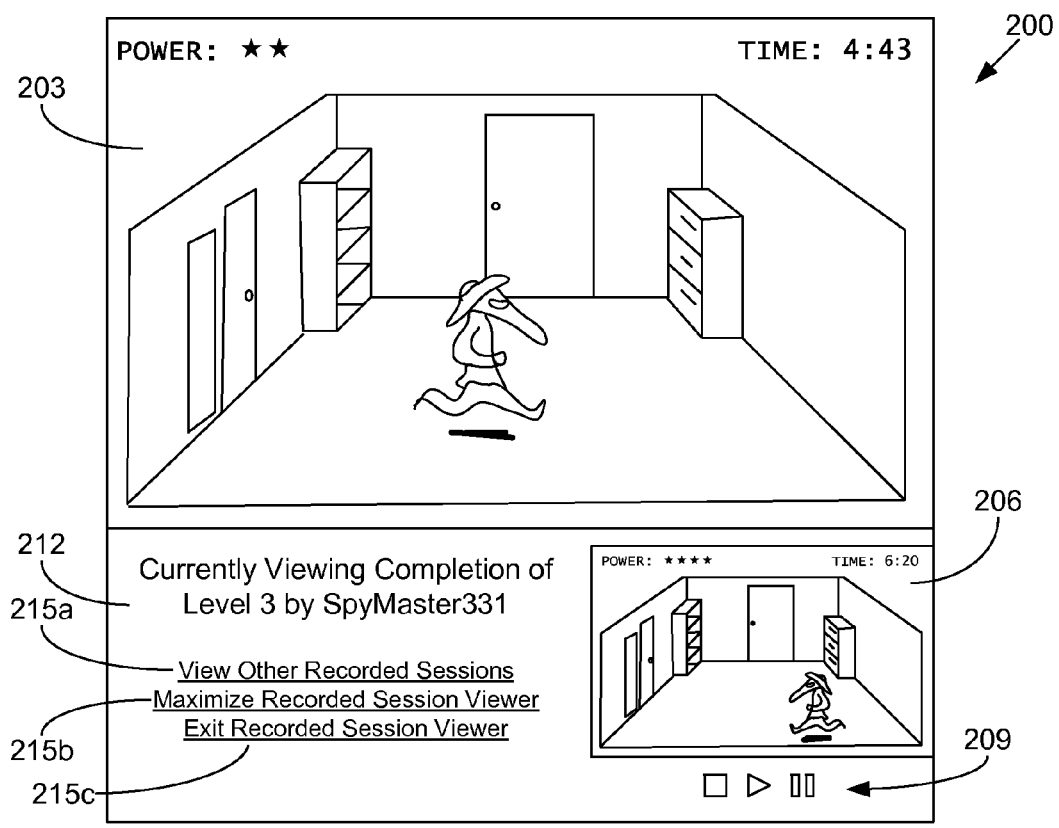
FIGS. 2 and 3 are drawings of examples of user interfaces rendered by a client in the networked environment of FIG. 1 according to various embodiments of the present disclosure.
Figure 3:
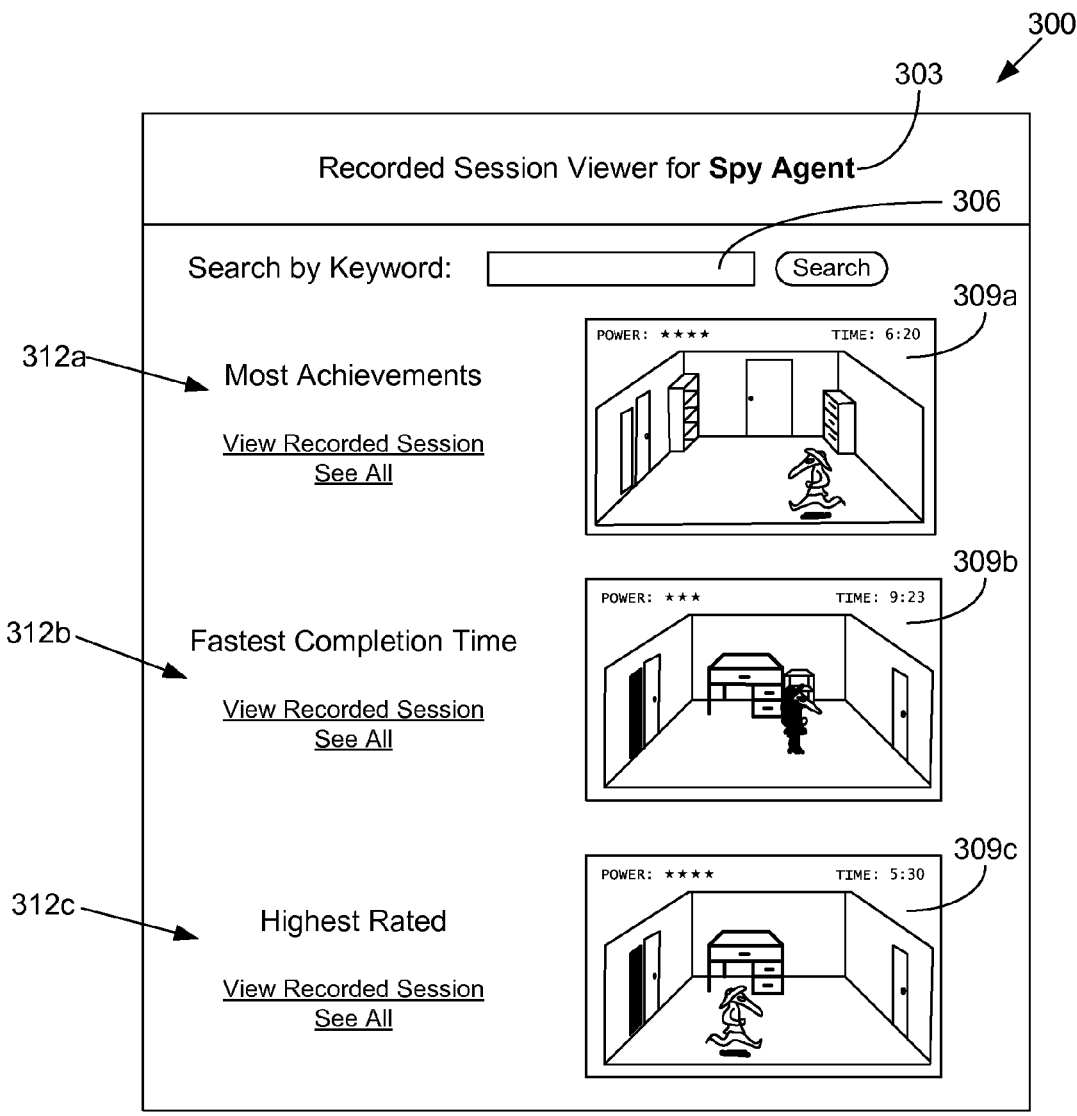

Various user interfaces (e.g., as shown in FIGS. 2 and 3) may be contemplated for selecting recorded media streams 135 and presenting them as recorded content in association with the real-time content generated from the application 119. In the example of a game, a user may want to see a recorded media stream 135 based on achievements earned. An achievement corresponds to the completion of an objective that is not critical to completing the game, such as earning points, entering a hidden area, collecting gold coins, carrying a garden gnome from beginning to end in a game, etc.

The assistance from other users may be provided also in the form of annotations 136 to the application 119. Such annotations 136 may include voiceover explanations, written explanations, image explanations, etc. In various embodiments, the annotations 136 may be presented in connection with the recorded media stream 135 of the user who created the annotations 136. In other embodiments, the annotations 136 may be presented while a user is using the application 119 at identifiable checkpoints. Various user interfaces may be contemplated for selecting and enabling the annotations 136.

In addition to providing help to users based on recorded media streams 135 and annotations 136, the server application 115 may be configured to allow users to save their own recorded media streams 135 and create annotations 136. To this end, the server application 115 may continuously record the real-time content media stream generated from the application 119 and allow users to select portions to be saved in the recorded media streams 135. If space allows, the server application 115 may save all media streams automatically and later discard those that are not useful for other users. Alternatively, a user may issue start and stop commands to control when a media stream is being recorded and saved.

Once a recorded media stream 135 is created, the server application 115 may allow the user to add metadata describing it. The server application 115 may also determine information regarding the recorded media stream 135 through an application programming interface (API) of the application 119 if available. Such information may include achievements earned, objectives completed, checkpoints passed, and so on. The user may also create and submit annotations 136 to be associated with the recorded media stream 135. The user may specify certain checkpoints or times associated with the recorded media stream 135 at which certain annotations 136 are to be displayed. Further, the user may specify that visual annotations 136 be displayed in certain areas of the screen 148.

Turning now to FIG. 2, shown is one example of a user interface 200 rendered in the client 106 (FIG. 1) in the networked environment 100 (FIG. 1). Specifically, the user interface 200 shows a screen 148 (FIG. 1) associated with an application 119 (FIG. 1) that is a game. Although the example of a game is used in FIG. 2, it is understood that other types of applications 119 may be employed in embodiments of the present disclosure. The layout of the various elements of the user interface 200 as shown in FIG. 2 is provided merely as an example and is not intended to be limiting.

The top portion of the screen 148 shows a video stream 203 that is currently being generated from the application 119 by a video encoder 120 (FIG. 1). In the video stream 203, the user at the client 106 is playing the game by moving a character around the world and sending other input commands to the application 119. Rendered in association with the video stream 203 is an auxiliary video stream 206 that corresponds to a recorded media stream 135 (FIG. 1). The auxiliary video stream 206 shows past usage of the application 119 and, in particular, past game play of the game. The playback of the auxiliary video stream 206 may be controlled by way of a set of media controls 209. It is noted that an auxiliary audio stream may also be played back in conjunction with the auxiliary video stream 206.

Descriptive text 212 may be provided to describe the auxiliary video stream 206. In this example, the descriptive text 212 states "Currently Viewing Completion of Level 3 by SpyMaster331." Thus, the descriptive text 212 may identify what is occurring in the auxiliary video stream 206 and the user who is controlling the application 119 as shown in the auxiliary video stream 206. In other examples, the descriptive text 212 may provide textual help, tips, suggested command sequences, etc. to the user to complete objectives in the application 119.

Various options 215 may be provided to the user for controlling the auxiliary video stream 206. Option 215a permits the user to view or browse other recorded sessions. To this end, another user interface may be loaded when option 215a is selected. Thumbnails and/or descriptions of various other recorded sessions may be shown to the user to facilitate a selection. Option 215b allows the user to maximize the current viewer. For example, selecting option 215b may permit the auxiliary video stream 206 to be resized larger to consume perhaps the entire screen 148 or the entire display 139 (FIG. 1). Option 215c allows the user to exit the recorded session viewer. When option 215c is selected, the video stream 203 may be maximized, and the user may return to playing the game instead of watching the auxiliary video stream 206. It is understood that other types of options 215 may be provided, for example, to provide a rating 137 (FIG. 1) for the auxiliary video stream 206, to enable or disable audio, to enable or disable textual help, and so on.

Moving on to FIG. 3, shown is an example of a user interface 300 rendered in the client 106 (FIG. 1) in the networked environment 100 (FIG. 1). Specifically, the user interface 300 shows a screen 148 (FIG. 1) associated with an application 119 (FIG. 1) that is, in this example, a game. Although the example of a game is used in FIG. 3, it is understood that other types of applications 119 may be employed in embodiments of the present disclosure. The layout of the various elements of the user interface 300 as shown in FIG. 3 is provided merely as an example and is not intended to be limiting.

A title 303 of the user interface 300 describes the user interface as a "Recorded Session Viewer for Spy Agent." The user interface 300 provides an interface for selecting various auxiliary media streams for presentation to the client 106. In particular, the auxiliary media streams are related to the game "Spy Agent." A search tool 306 is provided for a user to enter keywords for searching the various recorded media streams 135 (FIG. 1). The keywords may be matched against annotations 136 (FIG. 1), ratings 137 (FIG. 1), and/or other metadata that may be associated with recorded media streams 135.

Several thumbnails 309 are shown with representative images from the respective recorded media streams 135. Descriptions 312 of the recorded media streams 135 are also provided in conjunction with the thumbnails 309. The recorded media streams 135 that are initially highlighted in the user interface 300 may correspond to recorded media streams 135 that are superlative in various categories. For instance, the description 312a relates to a recorded media stream 135 that shows the "Most Achievements" for the game. The description 312b relates to a recorded media stream 135 that shows the "Fastest Completion Time" for the game. The description 312c relates to a recorded media stream 135 that shows the "Highest Rated" recorded media stream 135 for the game according to user ratings 137 for the game.

Each of the descriptions 312 may include user interface components for launching the playback of the associated recorded media stream 135, for example, as shown in FIG. 2. As a non-limiting example, a link is provided that is labeled "View Recorded Session." Further, a link may be provided ("See All") for a user to see other recorded media streams 135 in the particular category, e.g., most achievements, fastest completion time, highest rated, etc.

Figure 4:
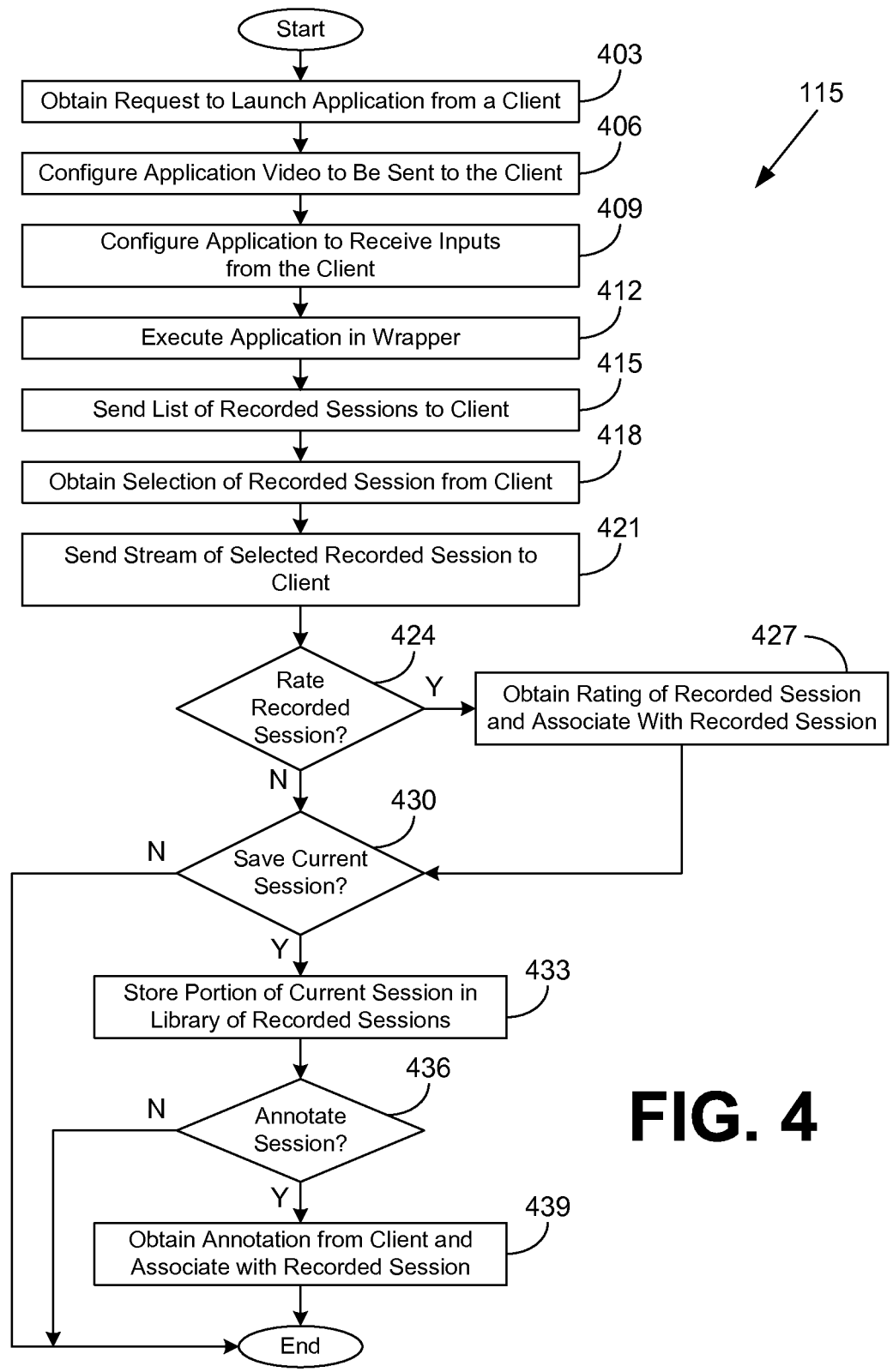
FIG. 4 is a flowchart illustrating one example of functionality implemented as portions of a server application executed in a computing device in the networked environment of FIG. 1 according to various embodiments of the present disclosure.

Referring next to FIG. 4, shown is a flowchart that provides one example of the operation of a portion of the server application 115 according to various embodiments. It is understood that the flowchart of FIG. 4 provides merely an example of the many different types of functional arrangements that may be employed to implement the operation of the portion of the server application 115 as described herein. As an alternative, the flowchart of FIG. 4 may be viewed as depicting an example of steps of a method implemented in the computing device 103 (FIG. 1) according to one or more embodiments.

Beginning with box 403, the server application 115 obtains a request to launch an application 119 (FIG. 1) from a client 106 (FIG. 1). In box 406, the server application 115 configures the video signal generated by the application 119 to be encoded by a video encoder 120 (FIG. 1) and to be sent to the client 106 as a media stream in the output data 123 (FIG. 1). In various embodiments, the media stream may include encoded audio signals generated by the application 119, images, and/or other multimedia data. In box 409, the server application 115 configures the application 119 to receive input commands from the client 106. To this end, the input commands embodied in the input data 122 (FIG. 1) are configured to be provided to the application 119.

In box 412, the application 119 is executed in the appropriate wrapper 118 (FIG. 1). The wrapper 118 provides a virtualized environment for execution of the application 119. As such, the wrapper 118 virtualizes one or more input devices 142 (FIG. 1) and provides the input commands obtained from the client 106 to the application 119 by way of the virtualized input devices 142.

In box 415, the server application 115 prepares a list of recorded sessions (i.e., recorded media streams 135 (FIG. 1)) that are relevant to the current application 119 and sends the list to the client 106. For example, where the application 119 is a game, the list may include the recorded media streams 135 that show game play for the current level of the game. The current level, checkpoint, etc. may be determined with reference to the application state information 124 (FIG. 1). In one embodiment, frames from the video signal generated by the application 119 may be analyzed and compared with fingerprints of the recorded media streams 135 to determine the recorded media streams 135 that appear to show a similar usage for the application 119.

In box 418, the server application 115 obtains a user selection of a recorded media stream 135 from the client 106. Alternatively, the server application 115 may automatically determine a recorded media stream 135 that is most relevant to the current usage of the application 119. For instance, the recorded media stream 135 from the list with the highest user rating may be selected. In box 421, the selected recorded media stream 135 is sent to the client 106 for display in association with the current media stream of the application 119. In one embodiment, the recorded media stream 135 is embedded within the current media stream of the application 119. In another embodiment, the recorded media stream 135 is sent separately from the current media stream of the application 119. As a non-limiting example, the recorded media stream 135 may be configured to be rendered in place of, adjacent to, overlaying, or otherwise in association with the current media stream of the application 119. In another non-limiting example, the recorded media stream 135 is configured to be shown as a picture within a picture on the display 139.

In box 424, the server application 115 determines whether the user at the client 106 is to provide a rating 137 (FIG. 1) for the recorded media stream 135. If the user is to provide a rating 137, the server application 115 proceeds to box 427 and obtains a rating 137 of the recorded media stream 135 from the client 106. The server application 115 then associates the rating 137 with the particular recorded media stream 135. As a non-limiting example, the user may click on a graphical icon showing a desired number of "stars" that are to be assigned to the recorded media stream 135 as a rating 137. Further, the user may provide comments and/or other feedback as a rating 137. The server application 115 then continues to box 430. If the server application 115 determines in box 424 that no rating 137 is to be obtained, the server application 115 also proceeds to box 430.

Next, in box 430, the server application 115 determines whether the current session (i.e., the media stream being generated from the application 119 and sent to the client 106) is to be saved. If the current session is not to be saved, the portion of the server application 115 ends. Otherwise, if the current session is to be saved, the server application 115, in box 433, stores a portion of the media stream of the current session in the library of recorded media streams 135. In one embodiment, the server application 115 may continuously store the media stream and then discard portions that are not later saved. A user interface may be provided for the user to select portions of the media stream to be saved. In another embodiment, the server application 115 may begin storing and saving the media stream only upon the command of a user.

In box 436, the server application 115 determines whether the session is to be annotated. If the session is not to be annotated, the portion of the server application 115 ends. Otherwise, if the session is to be annotated, the server application 115 proceeds to box 439 and obtains an annotation 136 (FIG. 1) from the client 106. The annotation 136 is stored in the data store 112 (FIG. 1) and associated with the recorded media stream 135 generated from the session. It is understood that the annotation 136 may take many different forms, such as, for example, an audio voiceover, helpful text, and so on. In some embodiments, annotations 136 may also be presented to users in conjunction with a current media stream and not a recorded media stream 135. Thereafter, the portion of the server application 115 ends.

Figure 5:
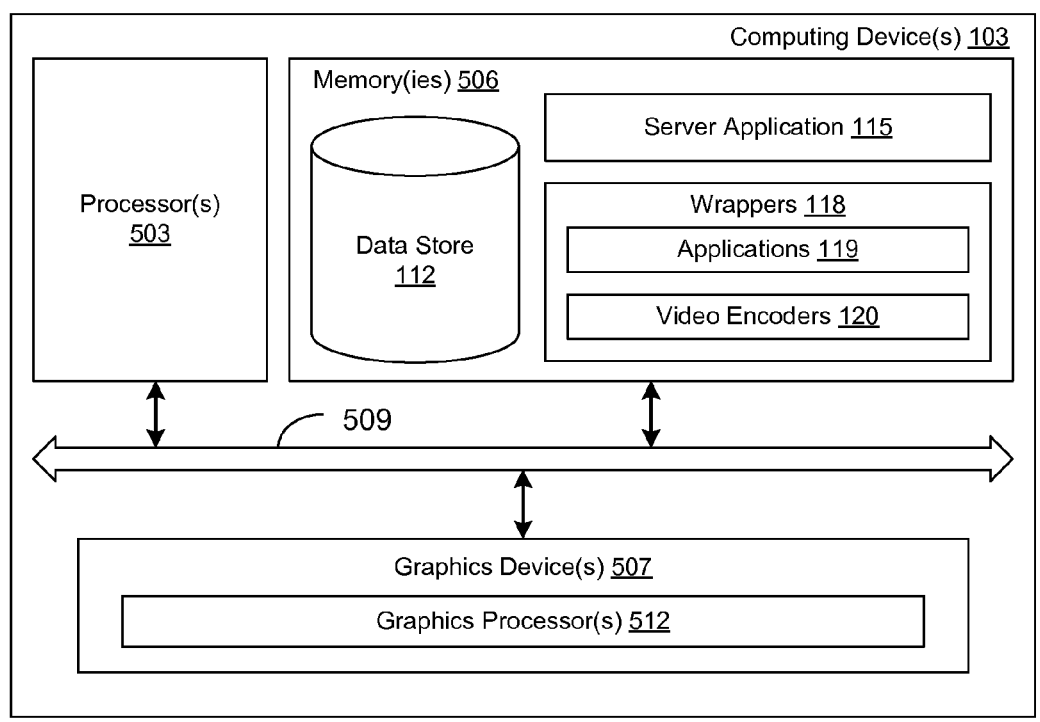
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503, a memory 506, and one or more graphics devices 507, all of which are coupled to a local interface 509. To this end, the computing device 103 may comprise, for example, at least one server computer or like device. The local interface 509 may comprise, for example, a data bus with an accompanying address/control bus or other bus structure as can be appreciated. The graphics devices 507 may correspond to high-performance graphics hardware, including one or more graphics processors 512. The graphics devices 507 are configured to render graphics corresponding to the applications 119 executed in the computing device 103.

Stored in the memory 506 are both data and several components that are executable by the processor 503. In particular, stored in the memory 506 and executable by the processor 503 are the server application 115, the wrappers 118, the applications 119, the video encoders 120, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the server application 115, the wrappers 118, the applications 119, the video encoders 120, the client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the server application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the server application 115, the wrappers 118, the applications 119, the video encoders 120, and the client application 145, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles Therefore, the following is claimed:

1. A non-transitory computer-readable medium embodying a program executable in a computing device, the program comprising:
   code that executes a game application in a virtual environment in a cloud computing resource, the game application being selected from a library of game applications;
   code that obtains a plurality of input commands from a client and provides the input commands to the game application through at least one virtual input device of the virtual environment;
   code that obtains a video signal generated by the game application, encodes the video signal into a media stream, sends the media stream to the client, and records a portion of the media stream in a library of recorded media streams, an input command history associated with the portion of the media stream being recorded with the portion of the media stream, wherein the portion of the media stream is determined based at least in part on a checkpoint of the game application completed relative to the portion of the media stream;
   code that obtains a selection by a user of a recorded media stream from the library of recorded media streams, the recorded media stream showing a past game play in the game application by another user; and
   code that sends the recorded media stream to the client for rendering in the client in association with the media stream.

2. The non-transitory computer-readable medium of claim 1, wherein the recorded media stream includes an annotation by the another user.

3. The non-transitory computer-readable medium of claim 1, wherein the program further comprises code that obtains feedback from the user regarding the recorded media stream.

4. A system, comprising:
   at least one computing device; and
   a server application executable in the at least one computing device, the server application comprising:
      logic that executes an application in a hosted environment in the at least one computing device;
      logic that obtains a plurality of input commands from a client and provides the input commands to the application;
      logic that obtains a video signal generated by the application, encodes the video signal into real-time content, and sends the real-time content to the client;
      logic that records at least a portion of the real-time content and adds the at least a portion of the real-time content to a library of recorded content;
      logic that selects recorded content from the library of recorded content based at least in part on at least one achievement completed in a past usage of the application shown in the recorded content, the past usage being previously recorded by the logic that records; and
      logic that sends the recorded content to the client.

5. The system of claim 4, wherein the recorded content and the real-time content are sent together in a combined media stream to the client.

6. The system of claim 4, wherein the real-time content is sent in a first media stream to the client, and the recorded content is sent in a second media stream to the client.

7. The system of claim 4, wherein the recorded content is configured to be displayed in the client in association with the real-time content.

8. The system of claim 4, wherein the recorded content is correlated with a current status of the application.

9. The system of claim 4, wherein the recorded content includes an annotation provided by a user associated with the past usage presented in the recorded content.

10. The system of claim 4, wherein the recorded content includes an annotation provided by a different user than a user associated with the past usage presented in the recorded content.

11. The system of claim 4, wherein the server application further comprises logic that determines whether a user at the client is experiencing difficulty in the application, and the recorded content is sent to the client in response to determining that the user is experiencing difficulty in the application.

12. The system of claim 11, wherein the logic that determines whether the user is experiencing difficulty in the application is configured to determine that the user is experiencing difficulty based at least in part on an input command history of the user.

13. The system of claim 4, wherein the server application further comprises logic that selects the recorded content from the library of recorded content based at least in part on at least one user-specified criterion.

14. The system of claim 4, wherein the at least a portion of the real-time content is added to the library in response to determining that the usage reflected in the at least a portion of the real-time content meets at least one criterion.

15. The system of claim 4, wherein the server application further comprises logic that determines a subset of the library of recorded content that pertains to a current status of the application in response to obtaining a request from the client.

16. The system of claim 15, wherein the logic that determines the subset of the library of recorded content is further configured to compare a fingerprint generated from the real-time content with a corresponding fingerprint associated with the recorded content.

17. The system of claim 15, wherein the logic that determines the subset of the library of recorded content is further configured to perform a search against user-provided data that identifies recorded content in the library of recorded content.

18. The system of claim 4, wherein the server application further comprises logic that facilitates a user selection of the recorded content from the library of recorded content.

19. The system of claim 4, wherein the server application further comprises logic that collects user ratings regarding at least some of the recorded content in the library.

20. A system, comprising:
   at least one computing device; and
   a server application executable in the at least one computing device, the server application comprising:
      logic that executes an application in a hosted environment in the at least one computing device;
      logic that obtains a plurality of input commands from a client and provides the input commands to the application;
      logic that obtains a video signal generated by the application, encodes the video signal into real-time content, and sends the real-time content to the client;
      logic that records at least a portion of the real-time content and adds the at least a portion of the real-time content to a library of recorded content, wherein the at least a portion of the real-time content is determined based at least in part on a checkpoint of the application completed relative to the at least a portion of the real-time content; and logic that sends recorded content from the library of recorded content to the client, wherein the recorded content presents a past usage of the application previously recorded by the logic that records.

21. The system of claim 20, wherein the server application further comprises logic that selects the recorded content from the library of recorded content based at least in part on at least one achievement completed in the past usage shown in the recorded content.

22. A method, comprising:

sending, in a client computing device, a plurality of input commands over a network to at least one computing device, wherein the input commands are to be provided to an application executed in a hosted environment in the at least one computing device; and obtaining, in the client computing device, a media stream from the at least one computing device, the media stream presenting a current usage of the application, the media stream including recorded content that presents a past usage of the application, the recorded content being selected in the at least one computing device based at least in part on at least one achievement completed in the past usage shown in the recorded content.

23. The method of claim 22, wherein the hosted environment comprises a virtualized environment.

24. The method of claim 22, further comprising providing, in the client computing device, an annotation in conjunction with the media stream, wherein the annotation is based at least in part on the past usage of the application, and wherein the annotation includes a plurality of input commands obtained from the past usage of the application.

25. The method of claim 22, wherein at least some of the input commands are obtained from an input command history associated with the past usage of the application.

26. The method of claim 22, wherein the application comprises a game application, the current usage corresponds to current game play, and the past usage corresponds to past game play.

27. The method of claim 22, wherein the media stream encodes a video signal generated by the application.

28. The method of claim 22, wherein the media stream includes a voiceover of a user whose past usage is presented in the recorded content.

29. The method of claim 22, further comprising rendering, in the client computing device, a video signal of the recorded content on a display in association with a video signal in the media stream that is being generated by the application.

30. The method of claim 22, further comprising rendering, in the client computing device, a user interface for selecting the recorded content from a library of recorded content.

31. The method of claim 22, further comprising sending, in the client computing device, a request for a list of recorded content that is relevant to a current position in the application.

* * * * *